United States Patent [19]
Saito et al.

[11] Patent Number: 5,159,915
[45] Date of Patent: Nov. 3, 1992

[54] FUEL INJECTOR

[75] Inventors: Kimitaka Saito, Nagoya; Tatsuyoshi Matsumoto, Okazaki; Toshihiko Igashira, Toyokawa, all of Japan

[73] Assignee: Nippon Soken, Inc., Nishio, Japan

[21] Appl. No.: 844,748

[22] Filed: Mar. 2, 1992

[30] Foreign Application Priority Data

| Mar. 5, 1991 | [JP] | Japan | 3-38646 |
| Nov. 8, 1991 | [JP] | Japan | 3-293190 |
| Nov. 8, 1991 | [JP] | Japan | 3-293196 |

[51] Int. Cl.$^5$ ............................................. F02M 31/00
[52] U.S. Cl. ...................................... 123/557; 123/538; 239/128
[58] Field of Search ............... 123/557, 538, 549, 545, 123/543, 547, 552; 239/585.1–585.4, 128

[56] References Cited

U.S. PATENT DOCUMENTS

| 3,601,110 | 8/1971 | Kamazuka . | |
| 3,738,578 | 6/1973 | Farrell | 239/585.4 |
| 4,267,976 | 5/1981 | Chatwin | 123/557 |
| 4,540,122 | 9/1985 | Teerman | 239/585.1 |
| 4,755,288 | 7/1988 | Mitchell et al. | 123/538 |
| 4,898,142 | 2/1990 | Van Wechem et al. | 123/557 |
| 4,969,432 | 11/1990 | Schwarnweber et al. | 123/538 |
| 5,050,569 | 9/1991 | Beunk et al. | 123/557 |
| 5,054,458 | 10/1991 | Wechem et al. | 123/557 |

FOREIGN PATENT DOCUMENTS 4945249 12/1971 Japan .
49-45250 12/1974 Japan .

Primary Examiner—E. Rollins Cross
Assistant Examiner—M. Macy
Attorney, Agent, or Firm—Cushman, Darby & Cushman

[57] ABSTRACT

A fuel injector for injecting a heated fuel into a combustion engine, comprises, an electro-magnetic coil for generating a fluctuating magnetic flux density, a fuel heating member in which the fluctuating magnetic flux density is generated by the electro-magnetic coil so that the fuel heating member is heated by the fluctuating magnetic flux density and a heat energy of the fuel heating member generated by the fluctuating magnetic flux density is transmitted to the fuel to supply the heated fuel, and a fuel path member in which the fuel flows to be injected from the fuel injector into the combustion engine and in which the fuel heating member is arranged to heat the fuel, wherein a magnetic permeability of the fuel heating member is larger than that of the fuel path member so that a magnetic flux density in the fuel heating member is larger than a magnetic flux density in the fuel path member.

20 Claims, 13 Drawing Sheets

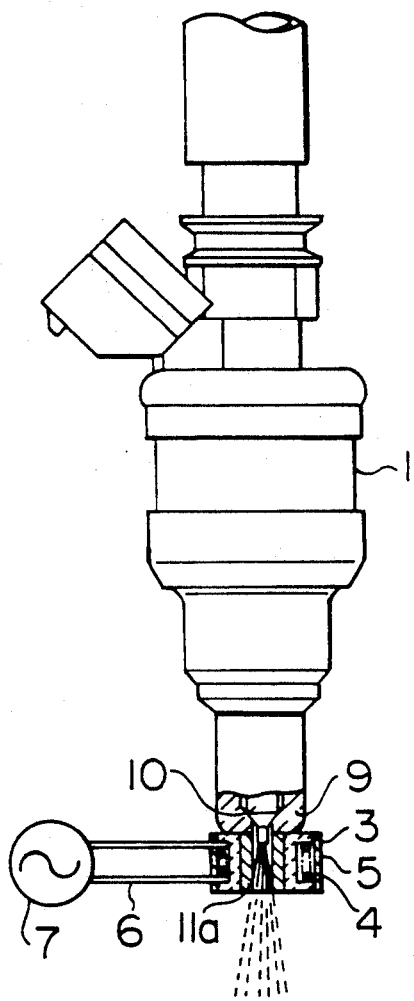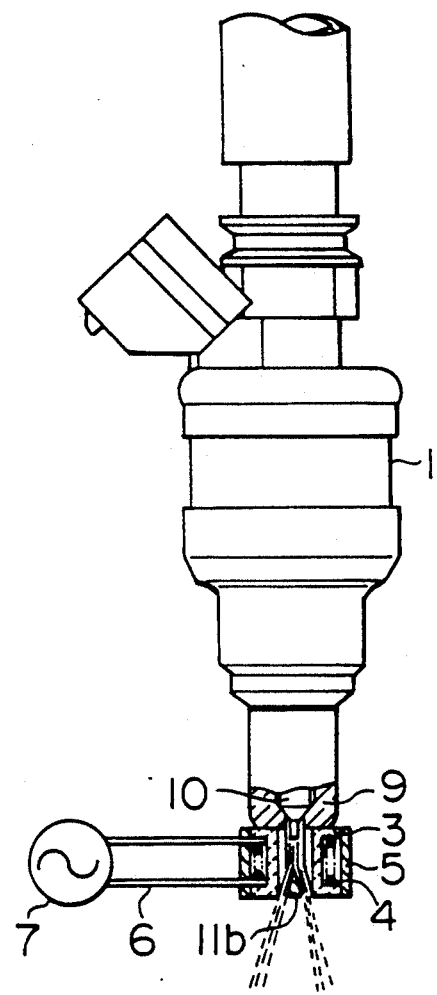
FIG. 6
FIG. 7

FIG. 9
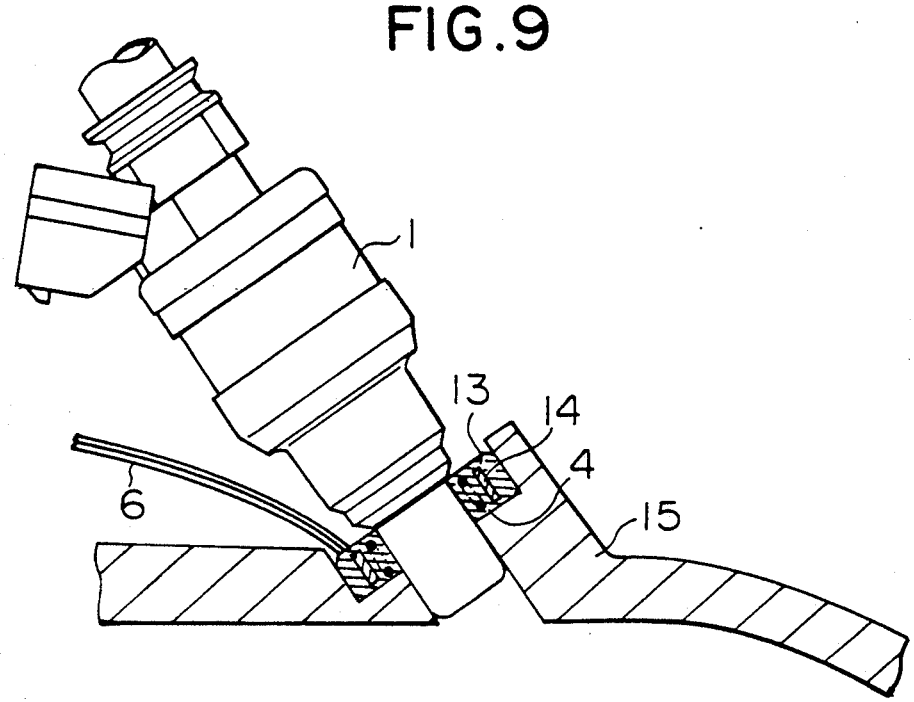
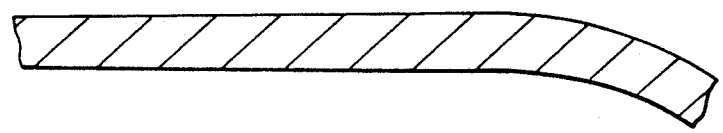
FIG. 10
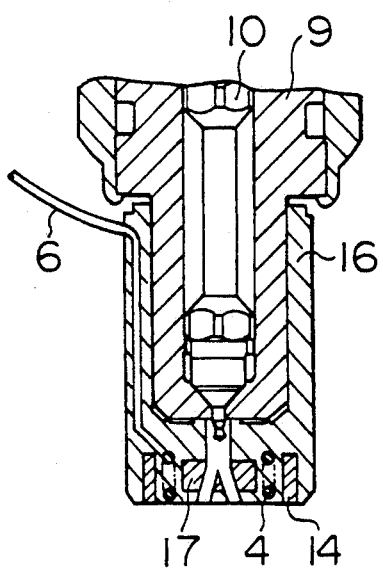

5,159,915

FUEL INJECTOR

BACKGROUND OF THE INVENTION AND RELATED ART STATEMENT

The present invention relates to a fuel injector from which a fuel heated therein is injected into a combustion engine.

A conventional fuel injector as disclosed in Japanese Patent Examined Publication No. 49-45249 and Japanese Patent Examined Publication No. 49-45250 has an electro-magnetic coil to generate fluctuating magnetic flux density at a forward end of the fuel injector so that the forward end is heated by eddy current and iron loss caused by the fluctuating magnetic flux density to heat the fuel. Since the injected fuel is heated, a vaporization of the fuel is accelerated for making an engine start in a cold condition easy, improving a combustion efficiency and decreasing atmospheric contamination by exhaust fumes.

OBJECT AND SUMMARY OF THE INVENTION

An object of the present invention is to provide a fuel injector in which a magnetomotive force of an electro-magnetic coil is effectively utilized for heating an injected fuel.

According to the present invention, a fuel injector for injecting a heated fuel into a combustion engine, comprises, electro-magnetic coil means for generating a fluctuating magnetic flux density, fuel heating means in which the fluctuating magnetic flux density is generated by the electro-magnetic coil means so that the fuel heating means is heated by the fluctuating magnetic flux density and a heat energy of the fuel heating means generated by the fluctuating magnetic flux density is transmitted to the fuel to supply the heated fuel, and fuel path means in which the fuel flows to be injected from the fuel injector into the combustion engine and in which the fuel heating means is arranged to heat the fuel, wherein a magnetic permeability of the fuel heating means is larger than that of the fuel path means so that a magnetic flux density in the fuel heating means is larger than a magnetic flux density in the fuel path means.

Since the magnetic flux density in the fuel heating means is larger than the magnetic flux density in the fuel path means in the fuel injector according to the present invention, an eddy current and/or iron loss per a unit volume in the fuel heating means by the fluctuating magnetic flux density is larger than an eddy current and/or iron loss per the unit volume in the fuel path means by the fluctuating magnetic flux density and a generated heat energy per the unit volume in the fuel heating means is larger than a generated heat energy per the unit volume in fuel path means. Therefore, a magnetomotive force of the electro-magnetic coil means is more effectively utilized at the fuel heating means for heating the fuel heating means, in comparison with a utilization of the magnetomotive force in the fuel path means for heating the fuel path means. Since the heating of the fuel heating means by the magnetomotive force is more effective than that of the fuel path means, the fuel can be heated strong at a limited part, that is, at the fuel heating means in the fuel path means so that the heat energy is effectively utilized for heating the fuel without an excessive heat of the fuel path means.

BRIEF DESCRIPTION OF THE DRAWINGS

FIG. 6 is a partially cross-sectional view showing a fourth embodiment of the present invention.

FIG. 7 is a partially cross-sectional view showing a fifth embodiment of the present invention.

FIG. 9 is a partially cross-sectional view showing a seventh embodiment of the present invention.

FIG. 10 is a partially cross-sectional view showing an eighth embodiment of the present invention.

DETAILED DESCRIPTION OF THE PREFERRED EMBODIMENTS

Figure 1:
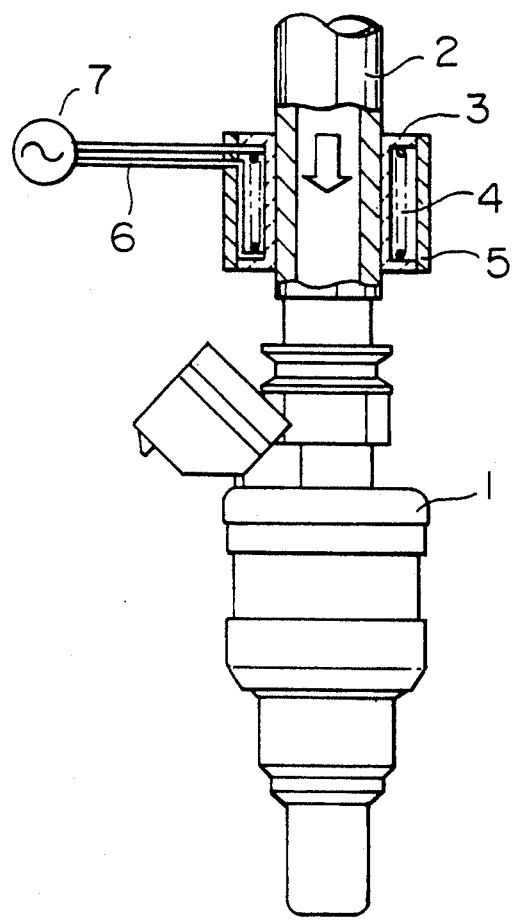
FIG. 1 is a partially cross-sectional view showing a first embodiment of the present invention.

In the first embodiment as shown in FIG. 1, a fuel is heated at an upstream side of a fuel injector 1 mounted on an intake tube of combustion engine (not shown). A fuel pressurized at a constant pressure by a fuel pump (not shown) flows in a fuel path tube 2 as the fuel heating means from a fuel tank (not shown) to the fuel injector 1. A core 3 as the fuel path means surrounds the fuel path tube 2 to form a fuel path therein and an electro-magnetic coil 4 of copper wire is wound on the core 3. The electro-magnetic coil 4 is covered by a housing 5 and is electrically connected by a lead 6 to a high-frequency electric current source 7. If a switch (not shown) is arranged on the lead 6, a high-frequency electric current supply from the source 7 can be switched on and off so that the high-frequency electric current may be supplied to the electro-magnetic coil 4 only when the combustion engine is started or may be controlled according to an engine load, an engine rotational speed or an engine temperature.

Figure 2:
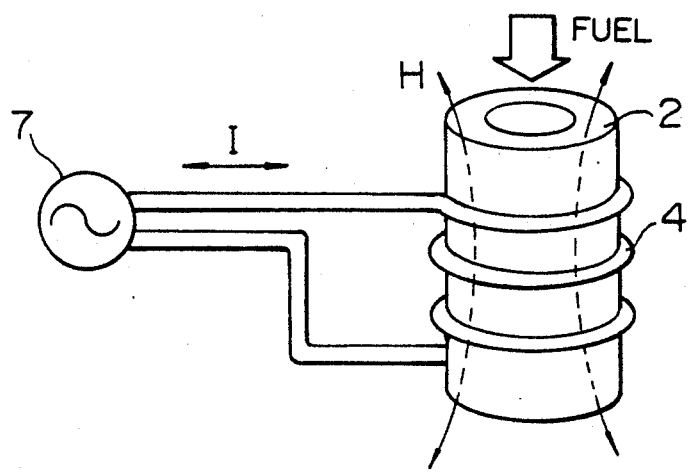
FIG. 2 is an obliquely projection view showing the first embodiment.

As shown in FIG. 2, when the high-frequency electric current I (more than KHz-more than MHz) is supplied from the high-frequency electric current source 7 to the electro-magnetic coil 4, a high-frequency fluctuating or alternate magnetic field H is generated in the fuel path tube 2 of magnetically permeable material arranged in the coil 4. The magnetic permeability of the fuel path tube 2 as the fuel heating means is high so that a magnetic flux density in the fuel path tube 2 can be large. Further, an electrical resistance of the fuel path tube 2 is low so that an eddy current generated by the high-frequency fluctuating magnetic field H in the fuel path tube 2 is large and/or an iron loss or hysteresis loss of the fuel path tube 2 in a relation between a magnetic field strength and a magnetic flux density (so-called B-H curve characteristic) is large, so that the fuel path tube 2 is effectively heated by the high-frequency fluctuating magnetic field H. The magnetic permeability of the core 3 as the fuel path means is low so that a magnetic flux density in the core 3 is small. Further, an electrical resistance of the core 3 is high so that the eddy current generated by the high-frequency fluctuating magnetic field H in the core 3 is small and/or the iron loss or hysteresis loss of the core 3 in the relation between the magnetic field strength and the magnetic flux density is small, so that the core 3 is not effectively heated by the high-frequency fluctuating magnetic field H. The pressurized fuel is heated by an inner-side surface of the heated fuel path tube 2 when the fuel passes through the fuel path tube 2. The heated fuel is injected into the intake tube through the fuel injector 1. Since the core 3 forming the fuel path therein is made of a heat-insulating and low-magnetic-permeability material, for example, a non-magnetic stainless steel, a synthetic resin, a rubber, or a ceramic, a heat energy of the heated fuel path tube 2 is not transmitted to the atmosphere and/or to the electro-magnetic coil 4 and a heat energy generated at the core 3 by the high-frequency fluctuating alternate magnetic field H is smaller than the heat energy of the heated fuel path tube 2. The housing 5 covering the electromagnetic coil 4 at the radial outside of the electro-magnetic coil 4 is made of a high-magnetic-permeability and low-iron-loss-or-hysteresis-loss material so that a magnetic reluctance of a magnetic circuit formed by the electro-magnetic coil 4, the fuel path tube 2, the core 3, the housing 5 and so forth is decreased for increasing an amount of magnetic flux in the magnetic circuit and the magnetic flux density in the fuel path tube 2 and an heat energy generated at the housing 5 is decreased. Therefore, only the fuel path tube 2 can be heated effectively for heating the fuel by the high-frequency fluctuating magnetic field H. Further preferably, the high-magnetic-permeability and low-iron-loss-or-hysteresis-loss material of the housing 5 has a high electrical resistance.

The fuel injector 1 as described above can inject a fine fuel mist into an intake air to be mixed therewith so that a constant fuel density in a mixed gas supplied to the combustion engine for complete combustion can be obtained. As a result of the complete combustion, a contaminative component density in exhaust gas from the combustion engine (particularly, a hydrocarbon density) is decreased, a stability of idle running of the engine is improved, a stability of spark of an ignition system is improved, a lean burn can be easily obtained, an amount of recirculated exhaust gas is increased, and a low fuel consumption is obtained.

Figure 3:
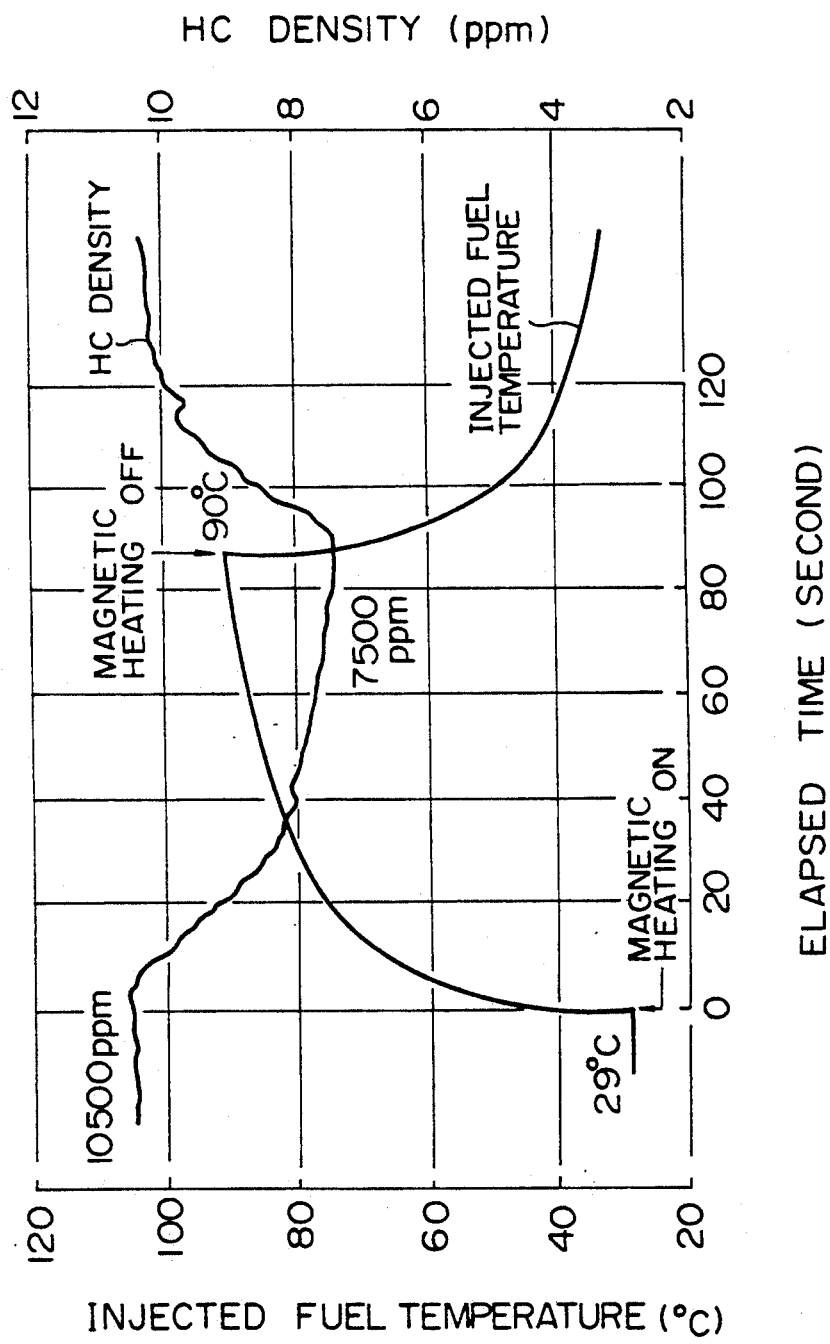
FIG. 3 is a diagram showing between a heating time and an injected fuel temperature and between the heating time and a hydrocarbon density in an exhaust gas.

FIG. 3 shows a change of hydro-carbon density in the exhaust gas and a change of temperature of the injected fuel in accordance with an actuation (ON) and stop (OFF) of the first embodiment of the fuel injector 1 during an engine operation. After the fuel injector 1 starts to heat the fuel, the temperature of the fuel increases rapidly from 29° C. to 90° C. and the hydro-carbon density in the exhaust gas decreases from 10500 ppm to 7500 ppm. If the fuel injector 1 stops heating the fuel, the temperature of the fuel and the hydro-carbon density in the exhaust gas returns to the original degrees, respectively.

Figure 4:
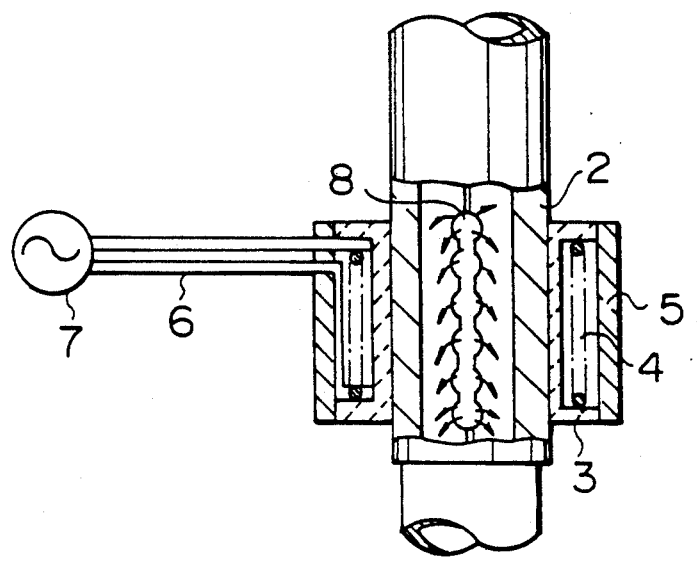
FIG. 4 is a cross-sectional view showing a second embodiment of the present invention.

In the second embodiment as shown in FIG. 4, the fuel path tube 2 is made of a heat-insulating and low-magnetic-permeability and low-iron-loss-or-hysteresis-loss and high-electric-resistance material, for example, a non-magnetic stainless steel, a synthetic resin, a rubber, or a ceramic so that the fuel path tube 2 as the fuel path means is not heated by the high-frequency fluctuating magnetic field H. A heated member 8 as the fuel heating means is arranged in the fuel path tube 2 and is made of a high-magnetic-permeability and high-iron-loss-or-hysteresis-loss material so that the heated member 8 as the fuel heating means is heated significantly largely in comparison with the fuel path tube 2 as the fuel path means. Further preferably, the high-magnetic permeability and high-iron-loss-or-hysteresis-loss material of the heated member 8 has a low electrical resistance. Since a large part of the heated member 8 is surrounded by the fuel, the heat energy generated at the heated member 8 by the high-frequency fluctuating magnetic field H is effectively transmitted to the fuel. The heated member 8 may have a plurality of curves on an outer surface thereof so that the heat energy generated at the heated member 8 is more effectively transmitted to the fuel.

Figure 5:
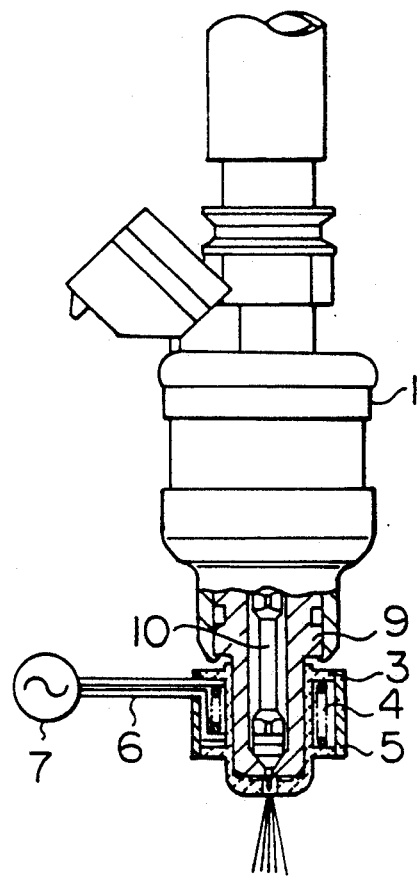
FIG. 5 is a partially cross-sectional view showing a third embodiment of the present invention.

In the third embodiment as shown in FIG. 5, a nozzle body 9 as the fuel path means of the fuel injector 1 has an injection nozzle therein and is made of a low-magnetic-permeability material, for example, a non-magnetic metal, a synthetic resin, a rubber, or a ceramic. The low-magnetic-permeability material of the nozzle body 9 as the fuel path means has preferably a low-iron-loss-or-hysteresis-loss and/or a high-electric-resistance. A valve needle 10 for controlling a flow rate of the fuel is received by the nozzle body 9 and is driven by a solenoid actuator (not shown) to change an opening area between the valve needle 10 and the nozzle body 9. The valve needle 10 is made of a high-magnetic-permeability material. The high-magnetic-permeability material of the valve needle 10 has a high-iron-loss-or-hysteresis-loss and/or a low electrical resistance material so that the valve needle 10 as the fuel heating means is heated significantly largely in comparison with the nozzle body 9 as the fuel path means by the high-frequency fluctuating magnetic field H generated by the coil 4. The core 3 with a low-magnetic-permeability, a low-hysteresis-loss and a high-electrical resistance surrounds a forward end of the nozzle body 9 to prevent a damage of the forward end and the electromagnetic coil 4 is wound on the core 3. Since the magnetic flux density in the nozzle body 9 is smaller than the magnetic flux density in the valve needle 10 and a large part of the valve needle 10 is surrounded by the fuel, the heat energy generated by the high-frequency fluctuating magnetic field H is effectively transmitted to the fuel.

In the fourth embodiment as shown in FIG. 6, a fuel heating tube 11a as the fuel heating means is arranged at a forward end of the fuel injector 1 at a downstream side thereof to heat the fuel injected from the fuel injector 1, and is made of a high-magnetic-permeability material. The high-magnetic-permeability material of the fuel heating tube 11a also has a high-iron-loss-or-hysteresis-loss and/or a low electrical resistance. The core 3 as the fuel path means of the fuel injector 1 surrounds the fuel heating tube 11a and is made of a low-magnetic-permeability and low-iron-loss-or-hysteresis-loss and high-electric-resistance material, for example, a non-magnetic metal, a synthetic resin, a rubber, or a ceramic. The electro-magnetic coil 4 is wound on the core 3. The fuel heating tube 11a is heated by the high-frequency fluctuating magnetic field H generated by the coil 4 into which the high-frequency fluctuating electric current is supplied from the high-frequency electric current source 7, so that the fuel injected from the fuel injector 1 is heated to accelerate a generation of the fuel mist when the fuel passes through the fuel heating tube 11a.

In the fifth embodiment as shown in FIG. 7 as a modification of the fourth embodiment, the fuel heating tube 11a is replaced by a fuel heating tube 11b in which a fuel path diverges into two injection orifices for two intake valves in each combustion chamber.

Figure 8:
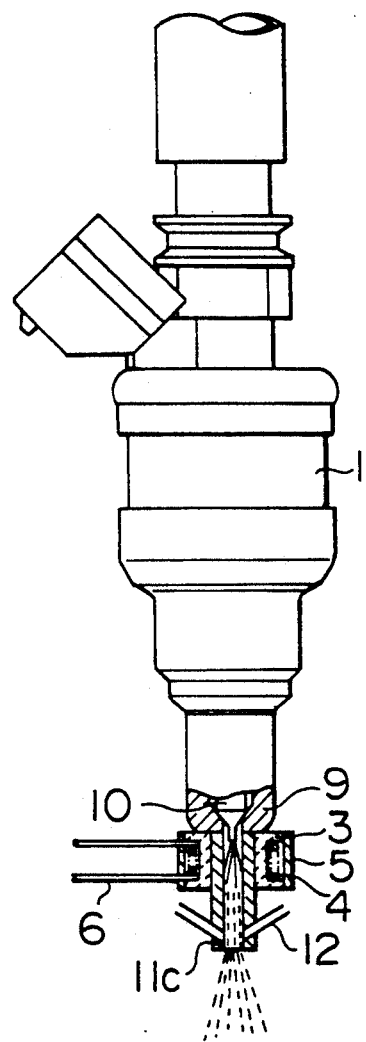
FIG. 8 is a partially cross-sectional view showing a sixth embodiment of the present invention.

In the sixth embodiment as shown in FIG. 8 as a modification of the fourth embodiment, the fuel heating tube 11a is replaced by a fuel heating tube 11c which has an air supply passage 12 to supply an air into a forward end of the fuel heating tube 11c so that the injected fuel is mixed with the air supplied through the air supply passage 12 for accelerating further the generation of the heated fuel mist. Since the air supply passage 12 is arranged at a downstream side of the fuel heating tube 11c, the fuel is heated sufficiently by the fuel heating tube 11c as the fuel heating means. If the air supply passage 12 is arranged at an upstream side of the fuel heating tube 11c, the air supplied from the fuel heating tube 11c is heated by the fuel heating tube 11c and a flow speed in the fuel heating tube 11c is accelerated by the air from the air supply passage 12 to decrease a time during which the fuel passes through the fuel heating tube 11c, so that the heat of the fuel is decreased in comparison with the case that the air supply passage 12 is arranged at the downstream side of the fuel heating tube 11c.

In the seventh embodiment as shown in FIG. 9, as a modification of the third embodiment as shown in FIG. 5, a rubber insulator 13 receives the electro-magnetic coil 4 to keep a hermetical sealing between the fuel injector 1 and the intake tube 15. A core 14 made of ferrite with a high-magnetic-permeability and a low-hysteresis loss is also received by the insulator 13 to surround the electromagnetic coil 4 so that a magnetic reluctance at a radial outside of the electromagnetic coil 4 is decreased to generate effectively the magnetic flux. In this embodiment, the valve needle 10 is heated as the third embodiment shown in FIG. 5.

In the eighth embodiment as shown in FIG. 10, the electro-magnetic coil 4 is received in an injection valve protector cap 16 made of a synthetic resin as the fuel path means. A forked path fuel heating tube 17 as the fuel heating means is received in the injection valve protector cap 16 at an inside of the electro-magnetic coil 4. A heat transmission from the forked path fuel heating tube 17 to the outside of the fuel injector 1 is prevented by the injection valve protector cap 16. The ferrite core 14 decreases a magnetic reluctance of a magnetic circuit as a member of the magnetic circuit composed of the electro-magnetic coil 4, the forked path fuel heating tube 17, the core 14 and the injection valve protector cap 16.

Figure 11:
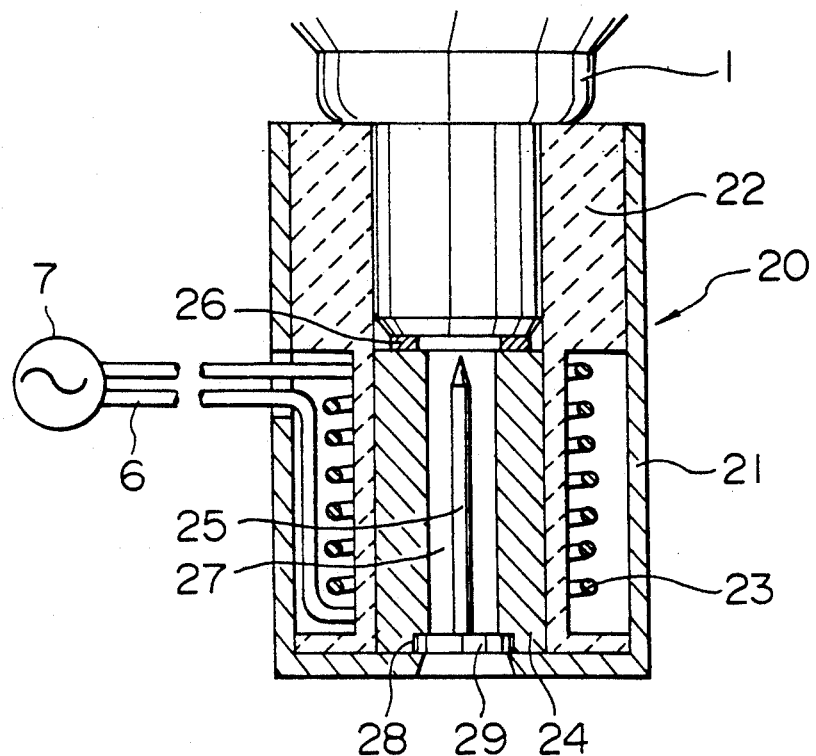
FIG. 11 is a cross-sectional partial view showing a ninth embodiment of the present invention.

In the ninth embodiment as shown in FIG. 11, a sleeve 20 is arranged at the forward end of the fuel injector 1 to include a housing 21 receive a ceramic bobbin 22 as the fuel path means, an electro-magnetic coil 23, a fuel heating tube 24 as the fuel heating means, a pin 25 as the fuel heating means and a gasket 26. The fuel heating tube 24 has a fuel passage 27 for the injected fuel and has a groove 28 at a lower end thereof for supporting a T-shaped lower end 29 of the pin 25. The electro-magnetic coil 23 is wound on the ceramic bobbin 22. The pin 25 has a tapered upper end and is supported along a central axis of the fuel passage 27 through the T-shaped lower end 29 thereof. The pin 25 and fuel heating tube 24 are made of pure iron with a high-magnetic-permeability and a low-electrical-resistance to be heated by the hysteresis-loss and/or the eddy current loss caused by the high-frequency fluctuating magnetic field H of the electro-magnetic coil 23. Therefore, the fuel is heated from both radial sides of the fuel injector 1 so that the fuel can be heated effectively and constantly for forming a constant mist of the injected fuel. The ceramic bobbin 22 with a low-magnetic-permeability and high-electrical-resistance and low-hysteresis-loss is not heated by the high-frequency fluctuating magnetic field H, but prevents a heat radiation from the fuel heating tube 24. If a temperature of the pin 25 reaches more than 200° C. and the fuel is gasoline, boiling bubbles of vaporized gasoline are generated between the gasoline and the pin 25 and fuel heating tube 24. Since the boiling bubbles disperse to destroy droplets of the fuel, the fuel mist is made more fine.

Figure 12:
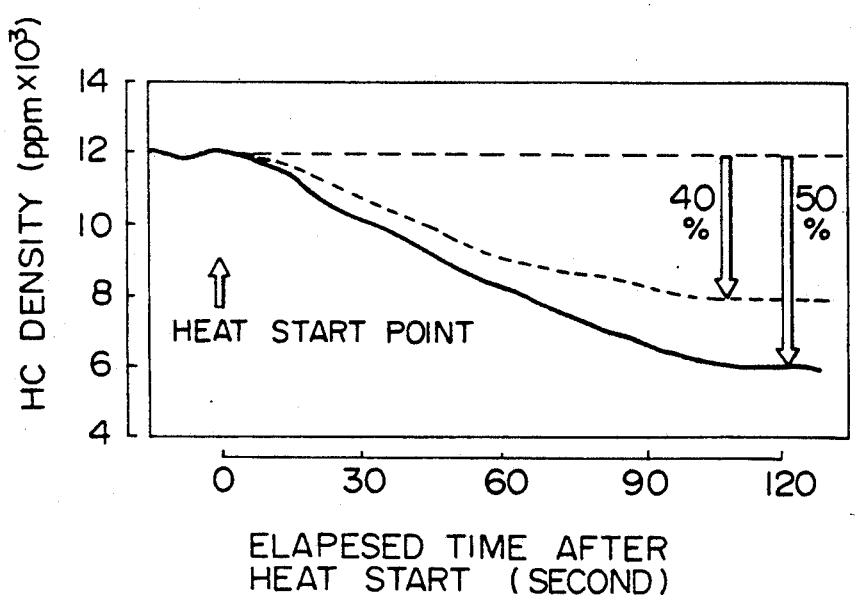
FIG. 12 is a diagram showing a relation among the heating time, the hydrocarbon density and a fuel heating effect.

In FIG. 12 showing an experimental result of the ninth embodiment, a variation of combustion engine exhaust gas hydro-carbon density shown by a solid line is obtained when the electro-magnetic coil is energized to heat the fuel injected through the ninth embodiment into the combustion engine after the combustion engine is operated at a constant operational condition without energization of the electro-magnetic coil. A variation of combustion engine exhaust gas hydro-carbon density shown by a broken line is obtained when an electro-magnetic coil is energized to heat the fuel injected through a fuel injector including the fuel heating tube without the pin after the combustion engine is operated at the constant operational condition without energization of the electro-magnetic coil. As clearly understood from FIG. 12, the pin is effective for decreasing rapidly the combustion engine exhaust gas hydro-carbon density. And, a saturation exhaust gas hydro-carbon density (=50% of initial exhaust gas hydro-carbon density) of the ninth embodiment is significantly smaller than that of the fuel injector including the fuel heating tube without the pin. The ninth embodiment with the pin 25 can heat the fuel sufficiently for several microseconds.

Figure 13:
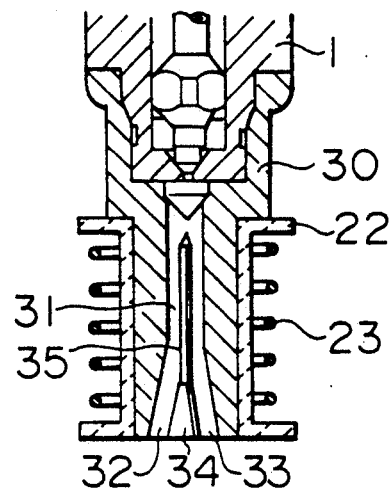
FIG. 13 is a cross-sectional partial view showing a tenth embodiment of the present invention.

In the tenth embodiment as shown in FIG. 13, a fuel path 31 of a fuel heating tube 30 as the fuel heating means diverges into two fuel passages 32 and 33 at a downstream side of the fuel heating tube 30. A pin 35 as the fuel heating means is arranged on a separation wall 34 between the fuel passages 32 and 33.

In the eleventh embodiment as shown in FIG. 11, a ceramic bobbin 36 as the fuel path means has a fuel path 27 and a groove 28 for supporting the lower end 29 of the pin 25 as the fuel heating means. Since only the pin 25 heats the fuel, a heat energy generated by the high-frequency fluctuating magnetic field H is 2 wholly utilized for heating the fuel.

Figure 14:
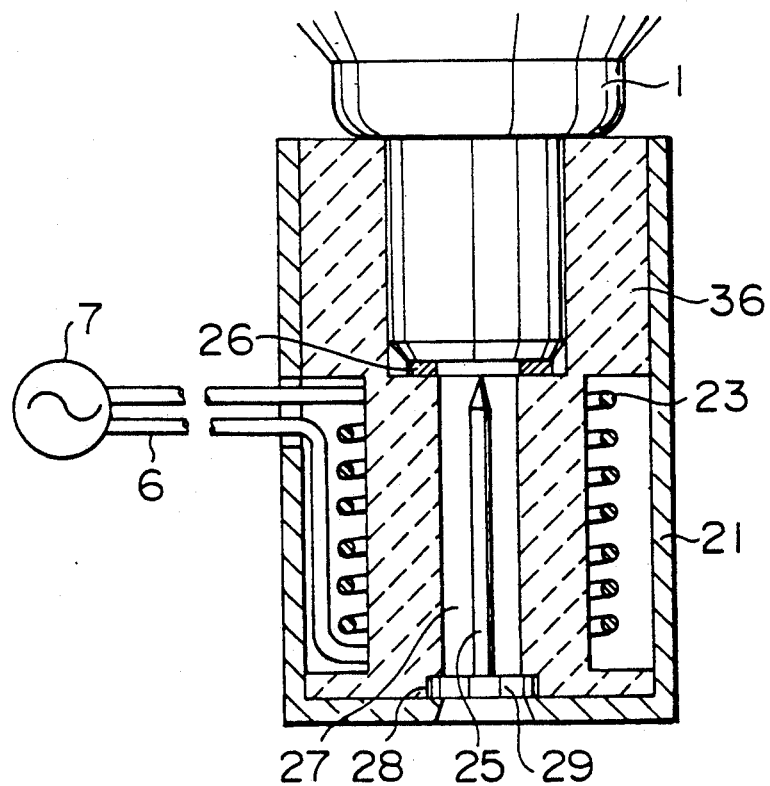
FIG. 14 is a cross-sectional partial view showing an eleventh embodiment of the present invention.
Figure 15:
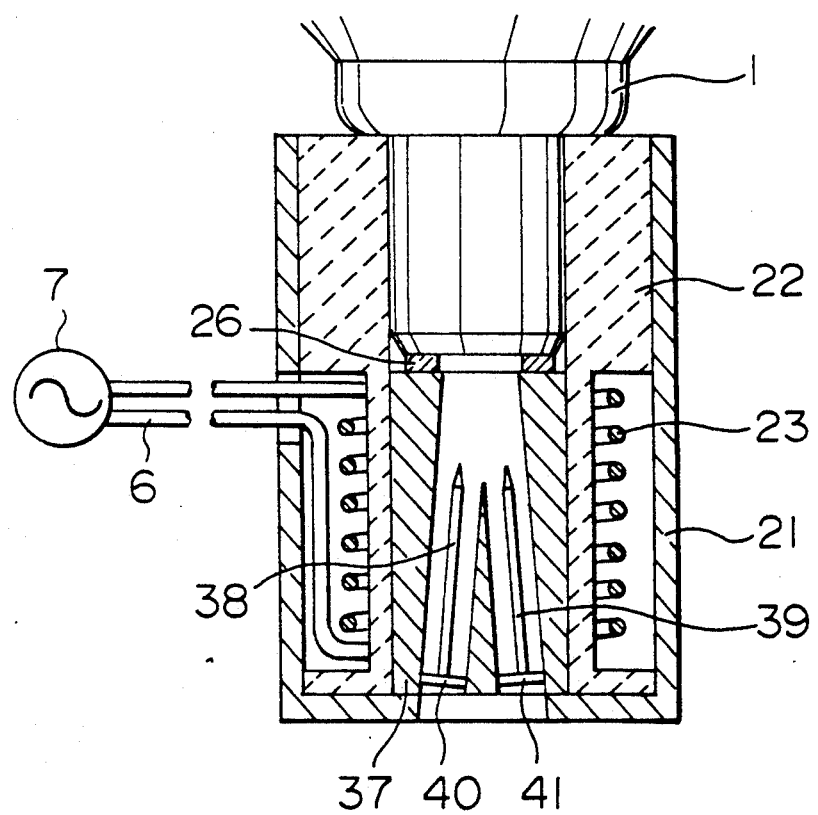
FIG. 15 is a cross-sectional partial view showing a twelfth embodiment of the present invention.

In the twelfth embodiment as shown in FIG. 15, two divergence fuel passages 38 and 39 of a fuel heating tube 37 as the fuel heating means receive respective pins 40 and 41 as the fuel heating means. Incidentally, the pins 40 and 41 are supported by respective grooves (not shown). The fuel heating tube 37 as the fuel heating means may be replaced by a ceramic bobbin including the two divergence fuel passages as shown in FIG. 14 so that the ceramic bobbin acts as the fuel path means and only the pins 40 and 41 act as the fuel heating means.

Figure 16:
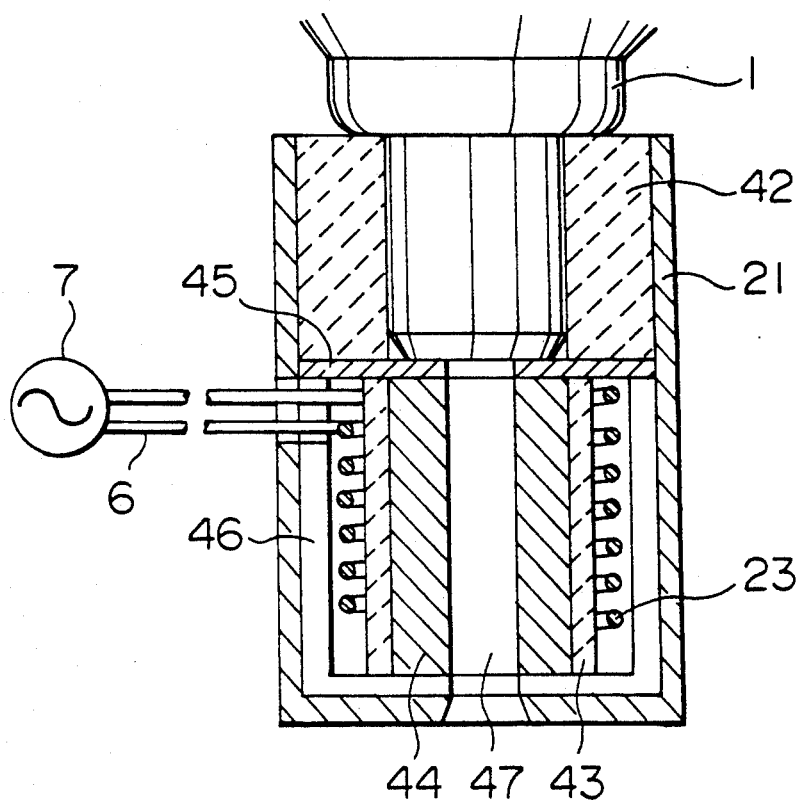
FIG. 16 is a cross-sectional partial view showing a thirteenth embodiment of the present invention.

In the thirteenth embodiment as shown in FIG. 16, the housing 21 receives a ceramic spacer 42, a ceramic bobbin 43 as the fuel path means, the electro-magnetic coil 23, a fuel heating tube 44 as the fuel heating means, a ferrite disk 45 and a ferrite cap 46. The fuel heating tube 44 has a cylindrical shape to form a fuel path 47 therein and is made of pure iron. Since the ferrite disk 45 and the ferrite cap 46 connect magnetically the fuel heating tube 44 thereto to form a closed magnetic circuit, the magnetomotive force of the electromagnetic coil 23 is effectively transmitted to the fuel heating tube 44 so that the fuel heating tube 44 is heated effectively. The ferrite has a high-magnetic-permeability and a low-hysteresis-loss so that the ferrite disk 45 and the ferrite cap 46 are not heated by the high-frequency fluctuating magnetic field H. Further, the ferrite has a high heat insulating characteristic, the heat energy of the fuel heating tube 44 cannot be transmitted to the outside of the fuel injector 1.

Figure 17:
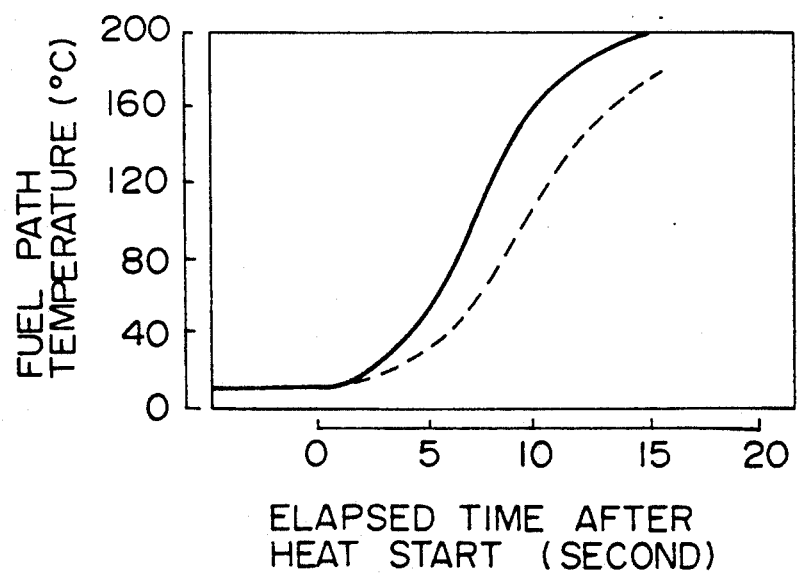
FIG. 17 is a diagram showing a relation among the heating time, a fuel path temperature and a magnetic permeability in magnetic flux circuit.

In FIG. 17, an increase in temperature of the fuel heating tube 44 of the thirteenth embodiment is shown by a solid line, and an increase in temperature of the fuel heating tube 44 of a fuel injector which is formed by deleting the ferrite disk 45 and the ferrite cap 46 from the thirteenth embodiment is shown by a broken line. As understood from FIG. 17, the ferrite disk 45 and the ferrite cap 46 accelerate the increase in temperature of the fuel heating tube 44.

Figure 18:
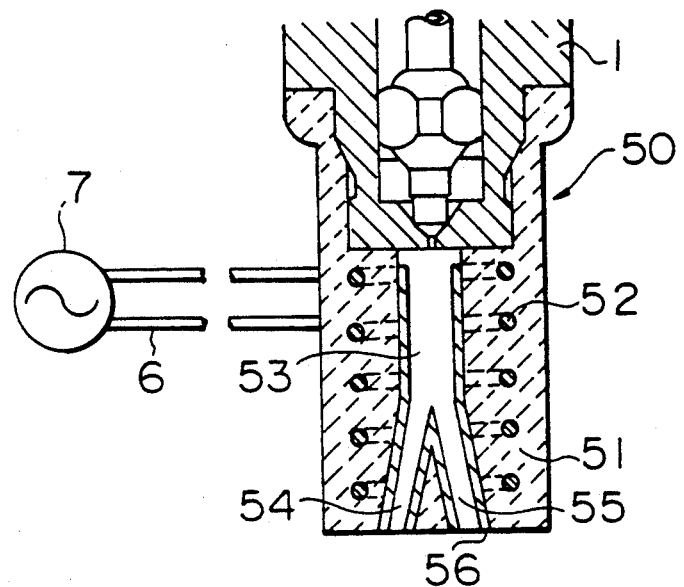
FIG. 18 is a cross-sectional partial view showing a fourteenth embodiment of the present invention.

In the fourteenth embodiment as shown in FIG. 18, a ceramic sleeve 51 as the fuel path means is arranged at the forward end of the fuel injector 1. The ceramic sleeve 51 receives integrally an electro-magnetic coil 52 and has a fuel path 53 diverging into fuel passages 54 and 55. An aluminum layer 56 of 0.1–0.5 mm thickness as the fuel heating means is arranged on an inner surface of each of the fuel path 53 and the fuel passages 54 and 55 through vacuum deposition process. When the electro-magnetic coil 52 is energized to generate the high-frequency fluctuating magnetic field, the aluminum layer 56 is heated by the eddy current caused by the fluctuating magnetic field so that the fuel can be heated effectively by a simple combination of the fuel heating means and the fuel path means. The aluminum layer 56 as the fuel heating means may be replaced by a plating layer including nickel and/or cobalt and/or chromium with a high magnetic permeability. The ceramic sleeve 51 as the fuel path means may be replaced by a synthetic resin sleeve with a low magnetic permeability.

Figure 19:
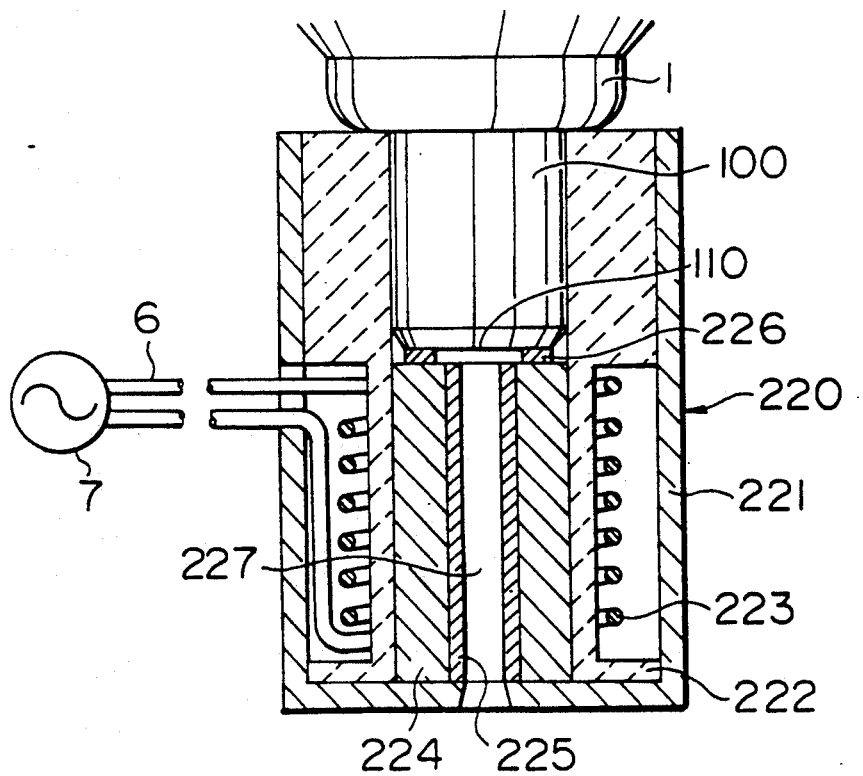
FIG. 19 is a cross-sectional partial view showing a fifteenth embodiment of the present invention.

In the fifteenth embodiment as shown in FIG. 19, a valve housing 100 of the fuel injector 1 has a fuel injecting opening 110 at a forward end thereof. A sleeve 220 mounted on the valve housing 100 receives a ceramic bobbin 222, an electro-magnetic coil 223, a fuel heating tube 224, a thermally sensitive ferrite 225 and a gasket 226 in a housing 221 thereof. The fuel heating tube 224 has a cylindrical shape and is made of pure iron with a high magnetic permeability, a low electrical resistance and a high hysteresis loss. The thermally sensitive ferrite 225 has a cylindrical shape and is received at the inside of the fuel heating tube 224 to form a path 227 for the fuel injected from the fuel injector 1. A copper line is wound on the ceramic bobbin 222 to form the electro-magnetic coil 223 connected to the high-frequency electric current supply from the source 7 through the lead 6. A supply of the high-frequency electric current can be controlled according to the operational condition of the combustion engine, when the switch is arranged on the lead 6. The pressurized fuel supplied to the fuel injector 1 from the fuel pump (not shown) is injected from the fuel injecting opening 110 so that the injected fuel is heated and changed to the fine mist.

The high-frequency electric current I (more than KHz-more than MHz) is supplied from the high-frequency electric current source 7 to the electro-magnetic coil 223 to generate the high-frequency fluctuating magnetic field H in the fuel heating tube 224 arranged at the inside of the electro-magnetic coil 223. Since the fuel heating tube 224 is made of a high-magnetic-permeability and high-iron-loss-and/or-hysteresis-loss material, the fuel heating tube 224 is heated effectively by the high-frequency fluctuating magnetic field H and the heat energy of the fuel heating tube 224 is transmitted through the thermally sensitive ferrite 225 to the fuel in the path 227 so that the fuel injected from the fuel injector 1 is heated in the path 227 to be changed to the fine fuel mist for the combustion engine.

Figure 20:
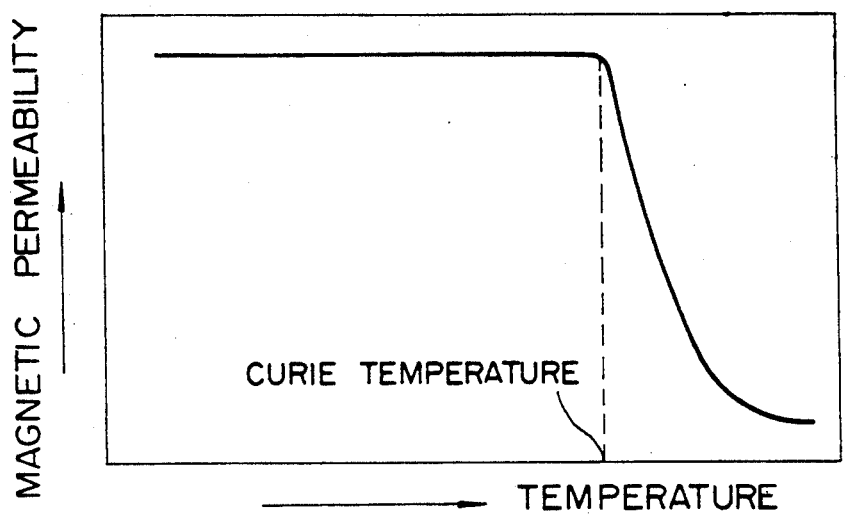
FIG. 20 is a diagram showing a relation between a magnetic permeability and a temperature.

As shown in FIG. 20, the magnetic permeability of the thermally sensitive ferrite 225 in a range less than the curie temperature is significantly larger than that in a range more than the curie temperature. And, the curie temperature of the thermally sensitive ferrite 225 is suitable for making the fine mist from the injected fuel with prevention of fuel combustion in the path 227. Just after the high-frequency electric current I begins to be supplied to the electro-magnetic coil 223, an actual temperature of the thermally sensitive ferrite 225 is lower than the curie temperature thereof so that the magnetic permeability thereof is high and the magnetic flux passes mainly at the inside of the fuel heating tube 224 to accelerate a temperature increase of the fuel heating tube 224. When the temperature of the thermally sensitive ferrite 225 reaches the curie point thereof, the magnetic permeability of the thermally sensitive ferrite 225 decreases significantly so that the temperature increase of the fuel heating tube 224 is prevented. Therefore, even if the high-frequency electric current I is continuously supplied to the electro-magnetic coil 223, a temperature in the path 227 is prevented from increasing to more than the curie temperature of the thermally sensitive ferrite 225 so that the fuel in the path 227 is heated by the constant temperature. Alternatively, the thermally sensitive ferrite 225 whose magnetic permeability in the rage more than the curie temperature thereof is significantly smaller than that in the rage less than the curie temperature thereof may be made of a high-magnetic-permeability-in-the-range-less-than-the-curie-temperature and high-iron-loss-and/or-low-electrical-resistance material as the fuel heating means and the fuel heating tube 224 my be made of a low-magnetic-permeability and low-iron-loss-and-high electrical-resistance material as the fuel path means.

Figure 21:
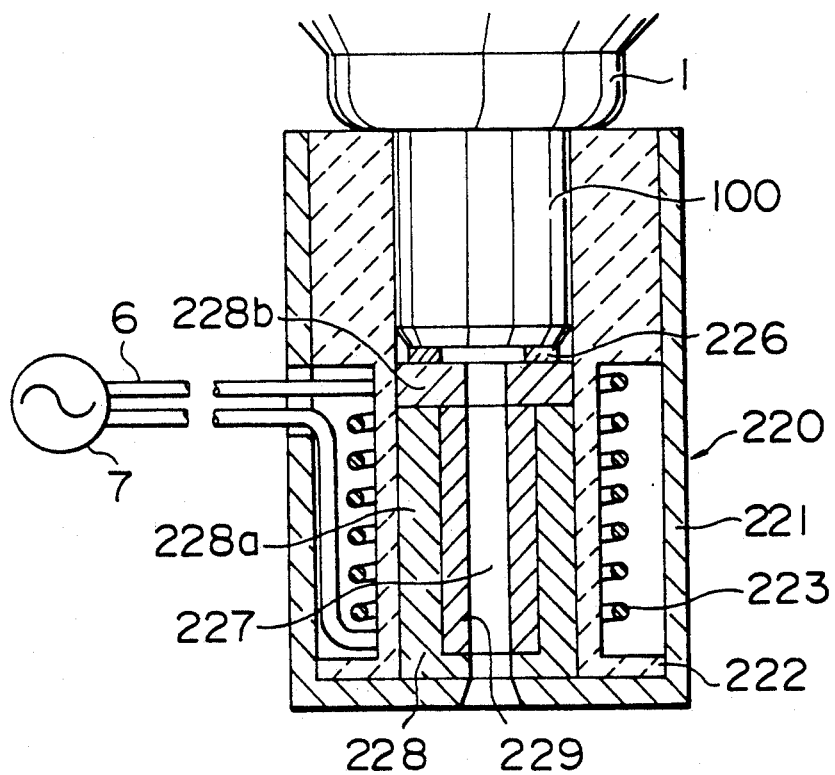
FIG. 21 is a cross-sectional partial view showing a sixteenth embodiment of the present invention.

In the sixteenth embodiment as shown in FIG. 21, the fuel path 227 is formed in a fuel path tube 229 as the fuel heating means received by the ceramic bobbin 222 as the fuel path means arranged in the electro-magnetic coil 223 so that the fuel is heated directly by the fuel path tube 229. A thermally sensitive ferrite 228 extends at a radially outside of the fuel path tube 229 and axially outsides of the fuel path tube 229. A part of the thermally sensitive ferrite 228 extending at the radially outside of the fuel path tube 229 may be deleted. The thermally sensitive ferrite 228 includes a cup-shaped member 228a and a disk-shaped member 228b. A part of the thermally sensitive ferrite 228 extending at each of the axially outsides of the fuel path tube 229 is effective for controlling the magnetic flux density passing through the fuel path tube 229. When a temperature of the thermally sensitive ferrite 228 is lower than the curie temperature thereof, the magnetic permeability thereof is high and the magnetic flux passing through the fuel path tube 229 is not decreased by the thermally sensitive ferrite 228 so that the fuel path tube 229 is effectively heated by the high-frequency fluctuating magnetic field H of the electro-magnetic coil 223. When the temperature of the thermally sensitive ferrite 228 is higher than the curie temperature thereof, the magnetic permeability thereof is low and the magnetic flux passing through the fuel path tube 229 is decreased by the thermally sensitive ferrite 228 so that the fuel path tube 229 is not effectively heated by the high-frequency fluctuating magnetic field H of the electro-magnetic coil 223. Therefore, the heating of the fuel by the fuel path tube 229 is controlled according to the temperature of the thermally sensitive ferrite 228 heated by the fuel path tube 229 so that the temperature of the fuel is kept at a predetermined degree corresponding to the curie temperature of the thermally sensitive ferrite 228.

Figure 22:
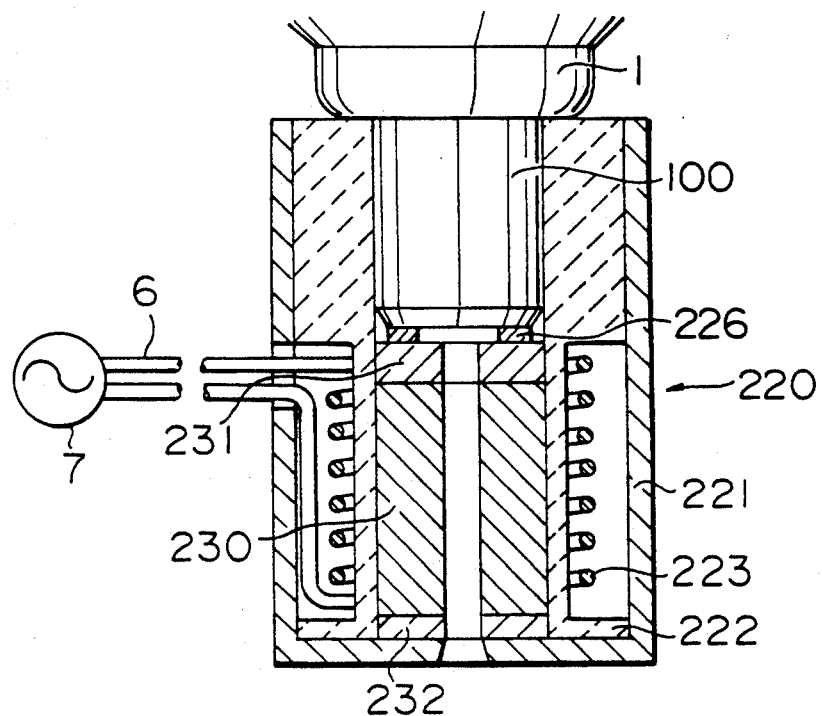
FIG. 22 is a cross-sectional partial view showing a seventeenth embodiment of the present invention.

In the seventeenth embodiment as shown in FIG. 22, the magnetic flux passing through the fuel path tube 230 as the fuel heating means is controlled by disk-shaped thermally sensitive ferrites 231 and 232 arranged at respective axial sides of the fuel path tube 230 surrounded by the ceramic bobbin 222 a the fuel path means. When the temperature of the thermally sensitive ferrites 231 and 232 is higher than the curie temperature thereof, the magnetic permeability thereof is low and the magnetic flux passing through the fuel path tube 229 is decreased by the thermally sensitive ferrites 231 and 232 so that temperature of the fuel path tube 230 is kept at a suitable degree even if the high-frequency fluctuating magnetic field H is always applied to the fuel path tube 230 and the thermally sensitive ferrites 231 and 232.

Figure 23:
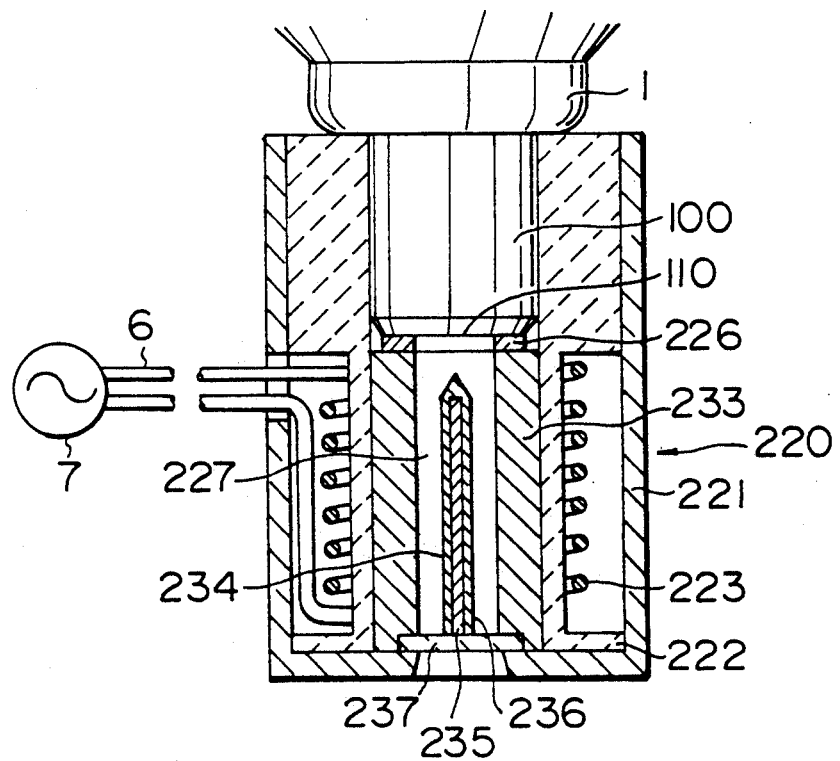
FIG. 23 is a cross-sectional partial view showing an eighteenth embodiment of the present invention.

In the eighteenth embodiment as shown in FIG. 23, the fuel path 227 is formed in a fuel path tube 233 made of a low-magnetic-permeability and low-iron-loss-and-high-electrical-resistance material as the fuel path means and a needle-shaped pin 234 made of a high-magnetic-permeability and high-iron-loss-and/or-low-electrical-resistance material as the fuel heating means is supported at a radially central portion of the fuel path 227 by a support member 237 transversing the fuel path 227. The pin 234 includes a heated portion 235 made of pure iron or a high-magnetic-permeability and high-iron-loss-and/or-low-electrical-resistance material and a thermally sensitive ferrite 236 which surrounds the pin 234 and whose magnetic permeability in a range less than the curie temperature thereof is significantly larger than that in a range more than the curie temperature thereof. When the temperature of the thermally sensitive ferrite 236 is lower than the curie temperature thereof after the high-frequency fluctuating magnetic field H begins to be applied to the pin 234, the magnetic permeability thereof is high and the magnetic flux passing through the heated portion 235 is not decreased by the thermally sensitive ferrite 236 so that the heated portion 235 is effectively heated by the high-frequency fluctuating magnetic field H of the electro-magnetic coil 223. When the temperature of the thermally sensitive ferrite 236 is higher than the curie temperature thereof, the magnetic permeability thereof is low and the magnetic flux passing through the heated portion 235 is decreased by the thermally sensitive ferrite 236 so that the heated portion 235 is not effectively heated by the high-frequency fluctuating magnetic field H of the electro-magnetic coil 223. Therefore, the heating of the fuel by the heated portion 235 is controlled according to the temperature of the thermally sensitive ferrite 236 heated by the heated portion 235 so that the temperature of the fuel is kept at a predetermined degree corresponding to the curie temperature of the thermally sensitive ferrite 236. The fuel from the injection opening 110 of the fuel injector 1 is heated by the pin 234 in the fuel path 227 and flows out through a space between the fuel path tube 233 and the support member 237 so that the fuel can be heated sufficiently for making the fine fuel mist. The pin 234 may be made of a material whose magnetic permeability in a range less than the curie temperature thereof is significantly larger than that in a range more than the curie temperature thereof and which has a high-magnetic permeability and a high-iron-loss-and/or-low-electrical-resistance.

What is claimed is:

1. A fuel injector for injecting a heated fuel into a combustion engine, comprising,
   electro-magnetic coil means for generating a fluctuating magnetic flux density,
   fuel heating means in which the fluctuating magnetic flux density is generated by the electro-magnetic coil means so that the fuel heating means is heated by the fluctuating magnetic flux density and a heat energy of the fuel heating means generated by the fluctuating magnetic flux density is transmitted to the fuel to supply the heated fuel, and
   fuel path means in which the fuel flows to be injected from the fuel injector into the combustion engine and in which the fuel heating means is arranged to heat the fuel, wherein
   a magnetic permeability of the fuel heating means is larger than that of the fuel path means so that a magnetic flux density in the fuel heating means is larger than a magnetic flux density in the fuel path means.

2. A fuel injector according to claim 1, wherein the fuel heating means has a high-hysteresis-loss characteristic.

3. A fuel injector according to claim 1, wherein the fuel heating means has a low-electrical-resistance.

4. A fuel injector according to claim 1, wherein the fuel heating means has a thermally sensitive characteristic by which the magnetic flux density through the fuel heating means decreases when a temperature of the fuel heating means is more than a predetermined degree.

5. A fuel injector according to claim 1, wherein the fuel injector further comprises thermally sensitive means for decreasing the magnetic flux density through the fuel heating means when a temperature of the thermally sensitive means is more than a predetermined degree.

6. A fuel injector according to claim 1, wherein the fuel path means has a low-hysteresis-loss characteristic in comparison with a hysteresis-loss characteristic of the fuel heating means.

7. A fuel injector according to claim 1, wherein the fuel heating means has a high-electrical-resistance in comparison with an electrical-resistance of the fuel heating means.

8. A fuel injector according to claim 1, wherein the fuel heating means is a tube shape whose inside allows the fuel to flow so that the fuel is heated at the inside of the fuel heating means.

9. A fuel injector according to claim 1, wherein the fuel heating means is a bar shape on which the fuel flows to be heated at an outer surface of the fuel heating means.

10. A fuel injector according to claim 1, wherein the fuel heating means is a layer arranged on the fuel path means.

11. A fuel injector according to claim 1, wherein the fuel heating means is surrounded by the electro-magnetic coil means.

12. A fuel injector according to claim 1, wherein the fuel path means is surrounded by the electro-magnetic coil means.

13. A fuel injector according to claim 1, wherein the fuel heating means contacts directly with the fuel.

14. A fuel injector according to claim 1, wherein the fuel injector further comprises magnetically conductive means for connecting magnetically an end of the fuel heating means to another end of the fuel heating means.

15. A fuel injector according to claim 1, wherein the fuel heating means is arranged at an upstream side of the fuel injector.

16. A fuel injector according to claim 1, wherein the fuel heating means is arranged at a downstream side of the fuel injector.

17. A fuel injector according to claim 1, wherein the fuel heating means is arranged at the inside of the fuel injector.

18. A fuel injector according to claim 5, wherein a magnetic permeability of the thermally sensitive means in a temperature range less than a predetermined temperature is larger than that in a temperature range more than the predetermined temperature.

19. A fuel injector according to claim 5, wherein the thermally sensitive means is arranged at an end of the fuel heating means so that the magnetic flux flows into the fuel heating means through the thermally sensitive means.

20. A fuel injector according to claim 5, wherein the thermally sensitive means surrounds the fuel heating means so that the magnetic flux density through the fuel heating means is changed when a magnetic permeability of the thermally sensitive means varies according to as temperature variation of the thermally sensitive means.

* * * * *